United States Patent [19]

Yamato

[11] Patent Number: 5,291,683
[45] Date of Patent: Mar. 8, 1994

[54] FISHING ROD
[75] Inventor: Yoshiro Yamato, Sakai, Japan
[73] Assignee: Shimano Inc., Osaka, Japan
[21] Appl. No.: 963,287
[22] Filed: Oct. 19, 1992

Related U.S. Application Data

[63] Continuation of Ser. No. 726,963, Jul. 8, 1991, abandoned.

[30] Foreign Application Priority Data

Jul. 20, 1990 [JP] Japan ............... 2-77761[U]
Jul. 20, 1990 [JP] Japan ............... 2-77762[U]

[51] Int. Cl.$^5$ .................................. A01K 87/06
[52] U.S. Cl. ................................. 43/22; 43/23
[58] Field of Search .......................... 43/22, 23

[56] References Cited

U.S. PATENT DOCUMENTS

| | | | |
|---|---|---|---|
| 1,980,317 | 11/1934 | Clark et al. | 43/22 |
| 1,994,449 | 3/1935 | Burdick | 43/22 |
| 2,756,531 | 7/1956 | Hollenshead | 43/23 |
| 3,197,908 | 8/1965 | Hirsch | 43/22 |
| 4,045,902 | 9/1977 | Ohmura | 43/22 |
| 4,335,480 | 10/1982 | Morishita | 43/23 |

Primary Examiner—Kurt C. Rowan
Assistant Examiner—James Miner
Attorney, Agent, or Firm—Dickstein Shapiro & Morin

[57] ABSTRACT

A fishing rod has a seat base including a fixed hood formed integral therewith for engaging a forward leg of a fishing reel, and a movable hood mounted in the seat base to be movable axially thereof for engaging a rearward leg of the fishing reel. The seat base defines an opening edge of a space for accommodating the movable hood. This opening edge is inclined, in side view, with respect to an axis of the fishing rod. A rotatable adjusting element is mounted on the seat base for adjusting position of the movable hood axially of the fishing rod. A slide contact element is disposed at an end of the rotatable adjusting element remote from the movable hood for limiting movement of the fishing rod 2. A fishing rod as claimed in claim 1, wherein said seat base includes a rotatable adjusting element relatively rotatably mounted thereon for adjusting position of said movable hood axially of the fishing rod.

4 Claims, 3 Drawing Sheets

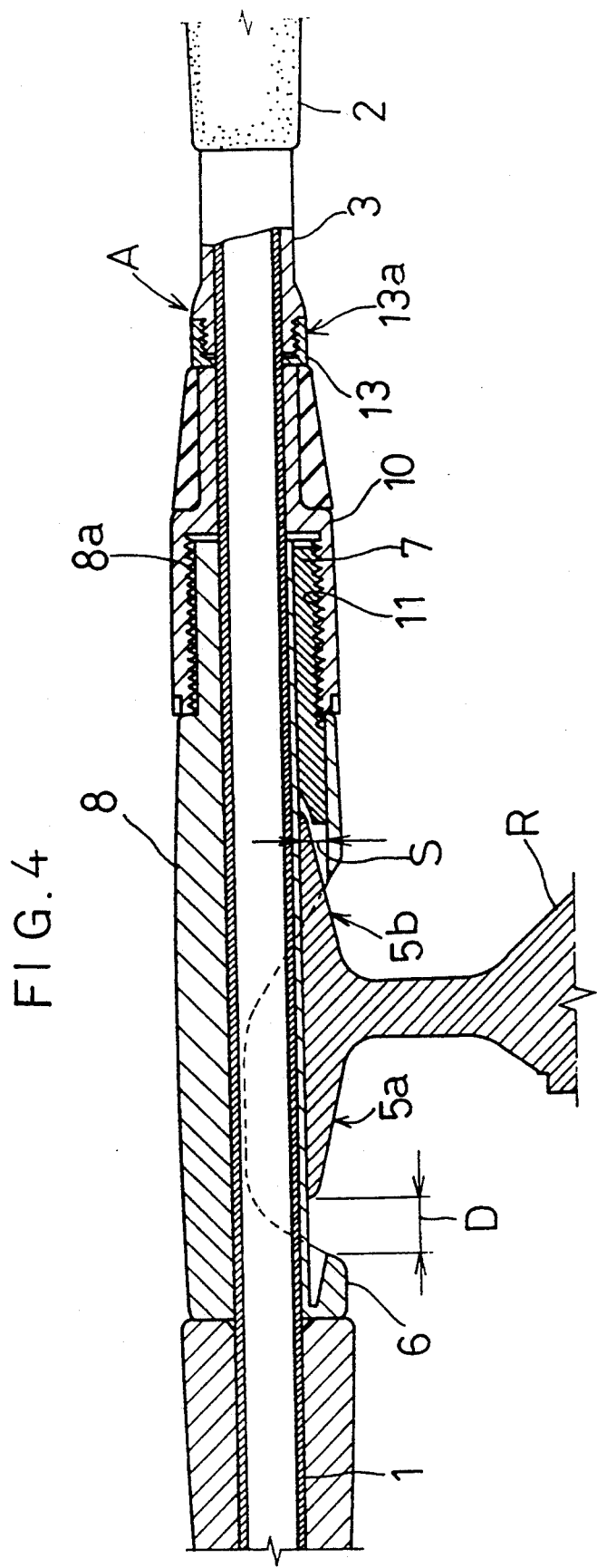

FISHING ROD

This application is a continuation of application Ser. No. 07/726,963 filed Jul. 8, 1991, now abandoned.

BACKGROUND OF THE INVENTION

1. Field of the Invention

This invention relates to fishing rods, and more particularly to a fishing rod having a reel seat including a fixed hood securely mounted on a rod stock and a movable hood movably axially of the rod stock for supporting a reel.

2. Description of the Related Art

A known example of such fishing rods is disclosed in Japanese Utility Model Publication Kokai No. 1989-168166. In this example, the fishing rod includes a turn control element slidable with a movable hood, and defines a threaded portion between the turn control element and a boss fixed peripherally of the rod, the movable hood is mounted on the boss to be axially movable but not rotatable relative to the rod, the movable hood being moved by screw feed of the turn control element.

According to the above known construction, a certain stepped portion or a difference in level inevitably is formed between the movable hood and boss.

In the case of a lure rod, the angler usually holds the fishing line and rod in the same hand, gripping the reel seat, before throwing the line in order to prevent loosening of the line wound on the reel. This action is frequently taken.

However, the stepped portion between the movable hood and boss in unpleasant to the touch when such a gripping operation is performed. Thus, there is room for improvement.

SUMMARY OF THE INVENTION

An object of the present invention is to provide a fishing rod eliminating the disadvantage of the prior art noted above.

The above object is fulfilled, according to the present invention, by a fishing rod comprising a seat base including a fixed hood formed integral therewith for engaging a forward leg of a fishing reel, a movable hood mounted in the seat base to be movable axially of the fishing rod for engaging a rearward leg of the fishing reel, wherein the seat base defines an opening edge of a space for accommodating the movable hood, the opening edge being inclined, in side view, with respect to an axis of the fishing rod.

Since, in the above construction, the movable hood is mounted in the seat base, the outer part of the fishing rod opposite the reel mounting position is defined solely by the seat base, and therefore is free from any stepped portion. Further, the opening edge of the space for accommodating the movable hood is inclined which, as distinct from a stepped portion perpendicular to the rod axis, presents a smooth feel to a gripping hand.

Thus, the present invention has realized a fishing rod having an improved construction to give a smooth touch when gripped, without impairing the reel supporting function.

Other features and advantages of the present invention will be apparent from the following description of the preferred embodiment.

BRIEF DESCRIPTION OF THE DRAWINGS

The drawings show a fishing rod according to the present invention, in which:

FIG. 4 is a sectional view showing a way in which a reel is mounted in position.

DETAILED DESCRIPTION OF THE PREFERRED EMBODIMENT

A fishing rod according to the present invention will be described in detail with reference to the drawings.

Figure 1:
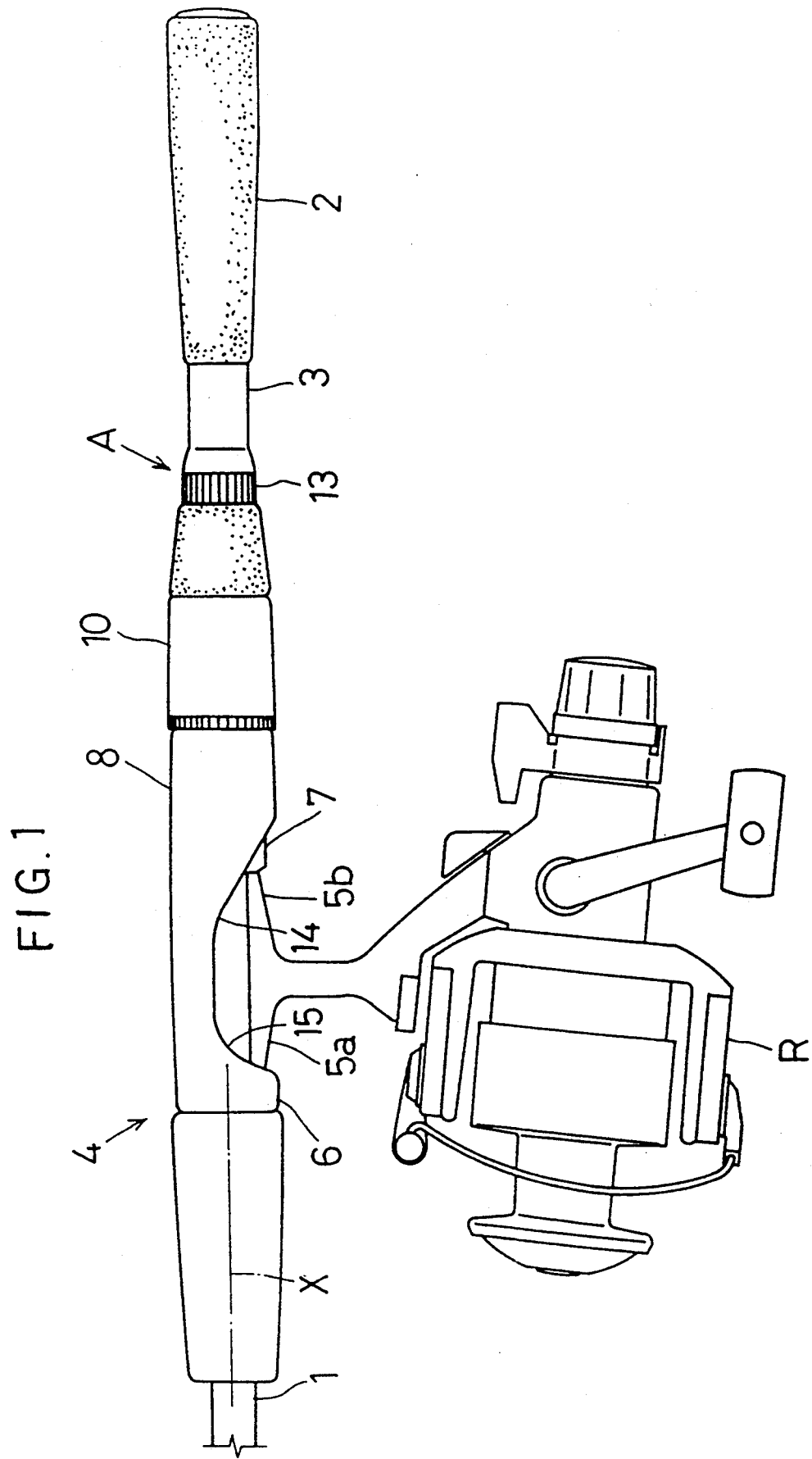
FIG. 1 is a side view of the fishing rod.

Referring to FIG. 1, a fishing rod embodying the present invention has a rod stock 1 carrying a grip 2 fixed to a rear end thereof, a spacer 3 mounted forwardly of the grip 2, and a reel seat 4 mounted forwardly of the spacer 3.

The reel seat 4 has a seat base 8 including a fixed hood 6 for engaging a forward leg 5a of a line winding reel R, and a movable hood 7 mounted inside the seat base 8 for engaging a rearward leg 5b of the reel R. The movable hood 7 is movable along an axis X of the fishing rod by screw feed.

Figure 2:
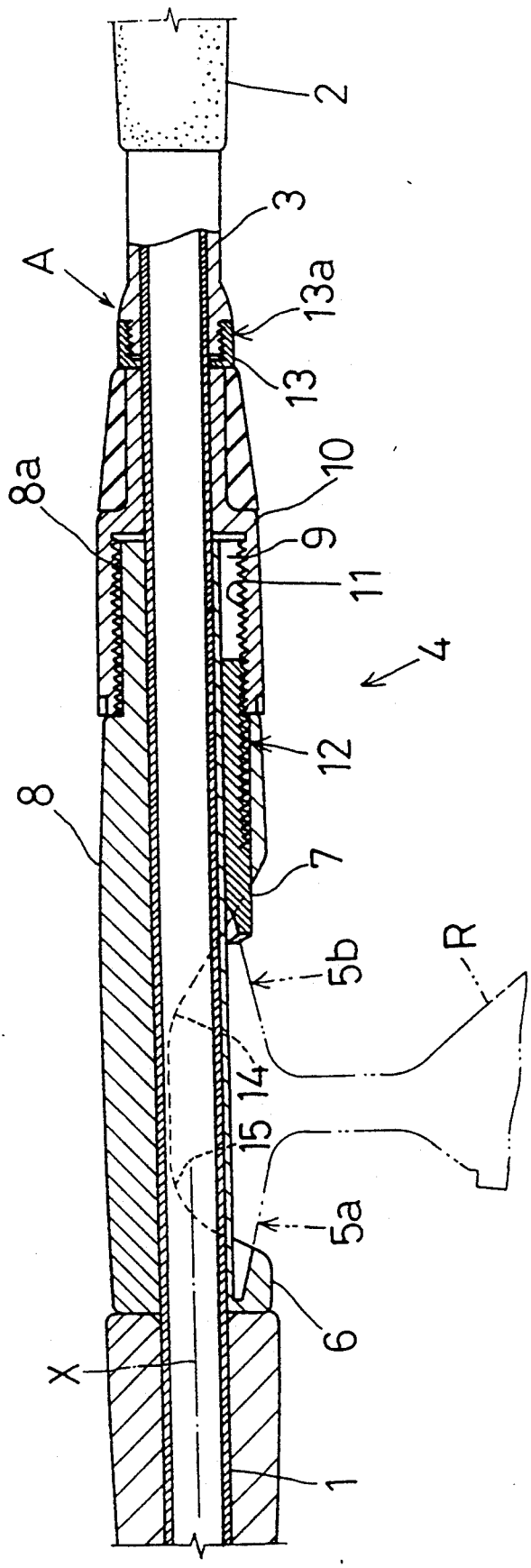
FIG. 2 is a side view in vertical section of the fishing rod.
Figure 3:
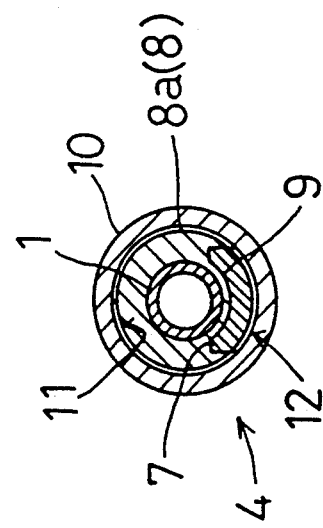
FIG. 3 is a front view in vertical section of the fishing rod.

Specifically, the seat base 8 is fixed peripherally of the rod stock 1, and defines a guide hole 9 extending axially of the rod, as also shown in FIGS. 2 and 3, for allowing only axial movement of the movable hood 7. For positionally adjusting the movable hood 7, a rotatable adjusting element 10 is rotatably fitted bridging a small diameter portion 8a of the seat base 8 opposed to the grip 2 and an outer periphery of the rod stock 1. The rotatable adjusting element 10 defines an internal screw 11 extending throughout an inside wall thereof opposed to the small diameter portion 8a. The movable hood 7 includes a threaded portion 12 defined peripherally thereof and meshed with the internal screw 11. Thus, the movable hood 7 is axially slidable by turning the rotatable adjusting element 10.

A metallic slide contact element 13 is interposed between an end of the rotatable adjusting element 10 opposed to the grip 2, i.e. the end remote from the movable hood 7, and the spacer 3 for limiting axial movement of the rotatable adjusting element 10. The slide contact element 13 defines an internal screw on an inside wall of a cylindrical portion 13a thereof opposed to the grip 2. The spacer 3 includes a peripheral screw portion opposed to the cylindrical portion 13a and meshed with the internal screw. The screw portion and the internal screw constitute a screw feed device A for moving the slide contact element 13 axially of the fishing rod.

With this construction, when the rotatable adjusting element 10 is tightened to secure the reel R, a reaction to the tightening and a flexion occur only partly in the circumferential direction in the portion of the rotatable adjusting element 10 meshed with the movable hood 7. Any gap produced between the rotatable adjusting element 10 and slide contact element 13 by the flexion may be eliminated by adjusting the slide contact element 13 through screw feed. Even if an error occurs in assembly to the rod stock 1, any gap resulting from the error may readily be eliminated by adjusting the slide contact element 13 through screw feed. Thus, an assembly operation does not require high precision.

During an assembly operation, fine positional adjustment and fixation are not necessary since the screw feed serves the purpose. This has the advantage of reducing the number of assembly processes.

When attaching the reel to the seat base 8, as shown in FIG. 4, the rearward leg 5b is inserted into an opening of the seat base 8, and thereafter the forward leg 5a is set opposite an opening of the fixed hood 6. Then, the rotatable adjusting element 10 is turned. As illustrated, the opening of the seat base 8 is set to a value S so that the forward leg 5a has an appropriate distance D to the fixed hood 6.

The seat base 8 defines an opening edge 14 of a space for accommodating the movable hood 7 and an opening edge 15 for defining the fixed hood 6. These edges 14 and 15 are inclined with respect to the axis X of the fishing rod, with the opening edge 15 of the fixed hood 6 having a sharper slant than the opening edge 14 adjacent the movable hood 7.

The described construction realizes an upper part of the reel seat 4 presenting a smooth curve free of any level difference. Although level differences occur in the lower part thereof due to the opening edges 14 and 15, the gently inclined configuration as seen in side view is smooth to the touch.

It will be appreciated that the present invention is applicable to various types of fishing rods as well as a lure rod.

What is claimed is:

1. A fishing rod comprising:
   a single seat base disposed to cover a rod stock and defining a first opening edge and a second opening edge;
   a fixed hood formed integral with said seat base wherein said fixed hood is adjacent to said second opening edge so as to engage a forward leg of a fishing reel;
   a movable hood disposed adjacent to said first opening edge comprising a threaded portion at an outer peripheral surface thereof, said movable hood being accommodated within a guide hole formed in said seat base, said outer peripheral surface of said movable hood being placed in contact with an inner surface of said seat base adjacent to said first opening edge so as to restrict said movable hood from moving radially of the axis of said fishing rod; and
   a rotatable adjusting element, relatively rotatably mounted on said seat base and extending from a small diameter portion of said seat base to said rod stock, said rotatable adjusting element defining an internal screw throughout an inside wall thereof opposed to said small diameter portion of the seat base, said adjusting element being rotatable about said rod axis while maintaining a position thereof along said rod axis so as to adjust a position of said movable hood along said rod axis thereby retaining said rearward leg of said fishing reel;
   wherein said first and second opening edges are inclined, in side view, with respect to said axis of the fishing rod, with said second opening edge having a sharper slant then said first opening edge.

2. A fishing rod as claimed in claim 1, further comprising a slide contact element disposed at an end of said rotatable adjusting element remote from said movable hood for limiting movement of said rotatable adjusting element axially of the fishing rod.

3. A fishing rod as claimed in claim 2, further comprising screw feed means for moving said slide contact element axially of the fishing rod.

4. A fishing rod as claimed in claim 3, wherein said screw feed means includes an internal screw defined on an inside wall of a rear cylindrical portion of said slide contact element, and a peripheral screw portion of a spacer disposed forwardly of a grip mounted on an end of the fishing rod, said peripheral screw portion being opposed to said cylindrical portion and meshed with said internal screw.

* * * * *